US010606330B2

(12) United States Patent
Maheswaran et al.

(10) Patent No.: US 10,606,330 B2
(45) Date of Patent: Mar. 31, 2020

(54) SELECTIVELY ENABLING BACKUP POWER TO NODES (71) Applicant: Hewlett Packard Enterprise Development LP, Houston, TX (US)

(72) Inventors: Sivathevan Maheswaran, Houston, TX (US); Mark Barlow Hammer, Houston, TX (US); James Alexander Fuxa, Houston, TX (US); Han Wang, Sugar Land, TX (US); Yovita Iskandar, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 44 days.

(21) Appl. No.: 15/550,877

(22) PCT Filed: Feb. 27, 2015

(86) PCT No.: PCT/US2015/018131
§ 371 (c)(1),
(2) Date: Aug. 14, 2017

(87) PCT Pub. No.: WO2016/137510
PCT Pub. Date: Sep. 1, 2016

(65) Prior Publication Data
US 2018/0032120 A1 Feb. 1, 2018

(51) Int. Cl.
*G06F 11/00* (2006.01)
*G06F 1/30* (2006.01)
*G06F 1/26* (2006.01)
*G06F 1/28* (2006.01)

(52) U.S. Cl.
CPC .............. *G06F 1/30* (2013.01); *G06F 1/263* (2013.01); *G06F 1/28* (2013.01)

(58) Field of Classification Search
CPC ... G06F 1/263; G06F 1/28; G06F 1/30; G06F 1/3206; G06F 1/3212
See application file for complete search history.

(56) References Cited

U.S. PATENT DOCUMENTS

| 7,451,336 | B2 | 11/2008 | Manuell et al. |
| 8,415,831 | B1 | 4/2013 | Hayes, Jr. et al. |
| 8,446,040 | B2 * | 5/2013 | Paik .......................... H02J 3/14 307/39 |

(Continued)

OTHER PUBLICATIONS

Eaton, "Eaton Power Quality and Distribution Solutions," (Research Paper), Nov. 2008, 12 pages, available at http://keyitec.com/BLADEUPS02FXA.pdf.

*Primary Examiner* — Marc Duncan
(74) *Attorney, Agent, or Firm* — Hewlett Packard Enterprise Patent Department (57) ABSTRACT

Example implementations relate to selectively enabling backup power to nodes. For example, a system includes a plurality of compute nodes, where each node includes a plurality of loads. The system also includes at least one backup power supply and control module coupled to the nodes and to the at least one backup power supply. The control module is to selectively enable an output of power from the at least one backup power supply to the nodes based on a comparison of a power capacity of the at least one backup power supply and a backup power demand of the nodes.

15 Claims, 5 Drawing Sheets

(56) References Cited

U.S. PATENT DOCUMENTS

| | | | |
|---|---|---|---|
| 8,464,080 B2* | 6/2013 | Archibald | G06F 1/26 713/300 |
| 8,499,184 B2* | 7/2013 | Hutchison | G06F 1/30 713/340 |
| 8,806,238 B2 | 8/2014 | Jau et al. | |
| 8,819,353 B2 | 8/2014 | Math et al. | |
| 9,615,333 B2* | 4/2017 | Brown | H04W 52/0261 |
| 10,128,684 B2* | 11/2018 | Ramamurthy | H02J 9/061 |
| 10,168,756 B2* | 1/2019 | Khessib | G06F 1/263 |
| 2005/0055587 A1 | 3/2005 | Lee | |
| 2008/0084680 A1 | 4/2008 | Islam et al. | |
| 2009/0310962 A1 | 12/2009 | Bernard et al. | |
| 2010/0037070 A1* | 2/2010 | Brumley | G06F 1/3209 713/300 |
| 2010/0299548 A1 | 11/2010 | Chadirchi et al. | |
| 2010/0332862 A1* | 12/2010 | Lester | G06F 1/30 713/300 |
| 2011/0018342 A1 | 1/2011 | Park et al. | |
| 2012/0192007 A1* | 7/2012 | Weilnau, Jr. | G06F 1/30 714/14 |
| 2012/0331317 A1* | 12/2012 | Rogers | G06F 1/28 713/320 |
| 2013/0007515 A1* | 1/2013 | Shaw | G06F 1/30 714/14 |
| 2013/0030735 A1 | 1/2013 | Jau et al. | |
| 2013/0038125 A1* | 2/2013 | Feldstein | H02J 3/14 307/39 |
| 2013/0067263 A1* | 3/2013 | Liu | H04W 52/0225 713/340 |
| 2013/0346762 A1* | 12/2013 | Hodges | H01M 10/4257 713/300 |
| 2014/0159495 A1* | 6/2014 | Nassar | H02J 7/0068 307/71 |
| 2015/0177814 A1* | 6/2015 | Bailey | G06F 1/3234 713/320 |
| 2016/0349822 A1* | 12/2016 | Nguyen | G06F 1/3212 |

* cited by examiner

SELECTIVELY ENABLING BACKUP POWER TO NODES

BACKGROUND

As reliance on computing systems continues to grow, so too does the demand for reliable power systems and backup schemes for these computing systems. Servers, for example, may provide architectures for backing up data to flash or persistent memory as well as backup power sources for powering the backup of data after an interruption of power.

BRIEF DESCRIPTION OF THE DRAWINGS

Some examples of the present application are described with respect to the following figures.

DETAILED DESCRIPTION

As the demand for low cost, scalable and density optimized high-performance computing increases, so too does the demand for higher density memory modules and storage. To improve the reliability of such computing systems and to prevent data loss, a backup power supply such as a battery backup unit may be provided, in the event of a primary power loss. As the demand for higher performance battery backup increases, the cost of backup power source may also increase in a node-based solution, where the battery backup resides on the node (e.g., a server node). If the node backup power source fails, in addition to the cost of replacing the backup power source, the corresponding server node my not have write cache (i.e., backup) enabled, thus resulting in an undesirable performance degradation. Accordingly, the node-based backup power solution may become expensive and unreliable as the demand for higher density memory modules and storage requires more power in the event of a power loss.

Examples disclosed herein address the above needs and challenges by providing a backup power supply at the enclosure/chassis level that is shared across multiple compute nodes (e.g., server nodes) and their corresponding loads (e.g., components such as memory, hard drives, array controllers, etc.). The shared backup power source is located within the enclosure/chassis of the system and may not be directly accessible by any node. A control module (e.g., a management system) can dynamically allocate backup power to the server nodes (and corresponding loads) based on a capacity of the shared backup power supply and demand (i.e., backup power demand) of the nodes.

In various examples, the control module can monitor the health and status of the backup power supply and enable/disable or isolate the backup power supply in the event of faults, enable/disable charging of the backup power supply, manage backup for the nodes in the event of primary power loss, provide brown-out management, and manage and dynamically allocate backup power to the nodes, for example, using conditionally controlled switches. Moreover, the control module can selectively provide power to the nodes, from the backup power supply, incrementally and while the backup power supply is charging (or not fully charged). The selective provisioning of the backup power can be based on a priority level of the nodes, a first-come-first-served basis, a round robin fashion, or any other predetermined basis.

In one example, a system includes a plurality of compute nodes, where each node includes a plurality of loads. The system also includes at least one backup power supply and control module coupled to the nodes and to the at least one backup power supply. The control module is to selectively enable an output of power from the at least one backup power supply to the nodes based on a comparison of a power capacity of the at least one backup power supply and a backup power demand of the nodes.

In another example, a method includes determining a power capacity of a plurality of backup power supplies and determining a backup power demand of a plurality of nodes, each node including a plurality of loads. The method also includes selectively enabling an output of backup power from the plurality of backup power supplies to the plurality of nodes based on a comparison of the power capacity and the backup power demand.

In another example, a non-transitory computer-readable storage medium is encoded with instructions executable by a processor to determine a power capacity of a plurality of backup power supplies and to determine a backup power demand of a plurality of nodes. The instructions are further executable to selectively enable an output of backup power from the plurality of backup power supplies to the plurality of nodes based on the power capacity of the backup power supplies, the backup power demand of the nodes, and a priority level of the nodes or a first-come-first-served basis. The selective enablement is performed incrementally, prior to the backup power supplies being fully charged.

Figure 1:
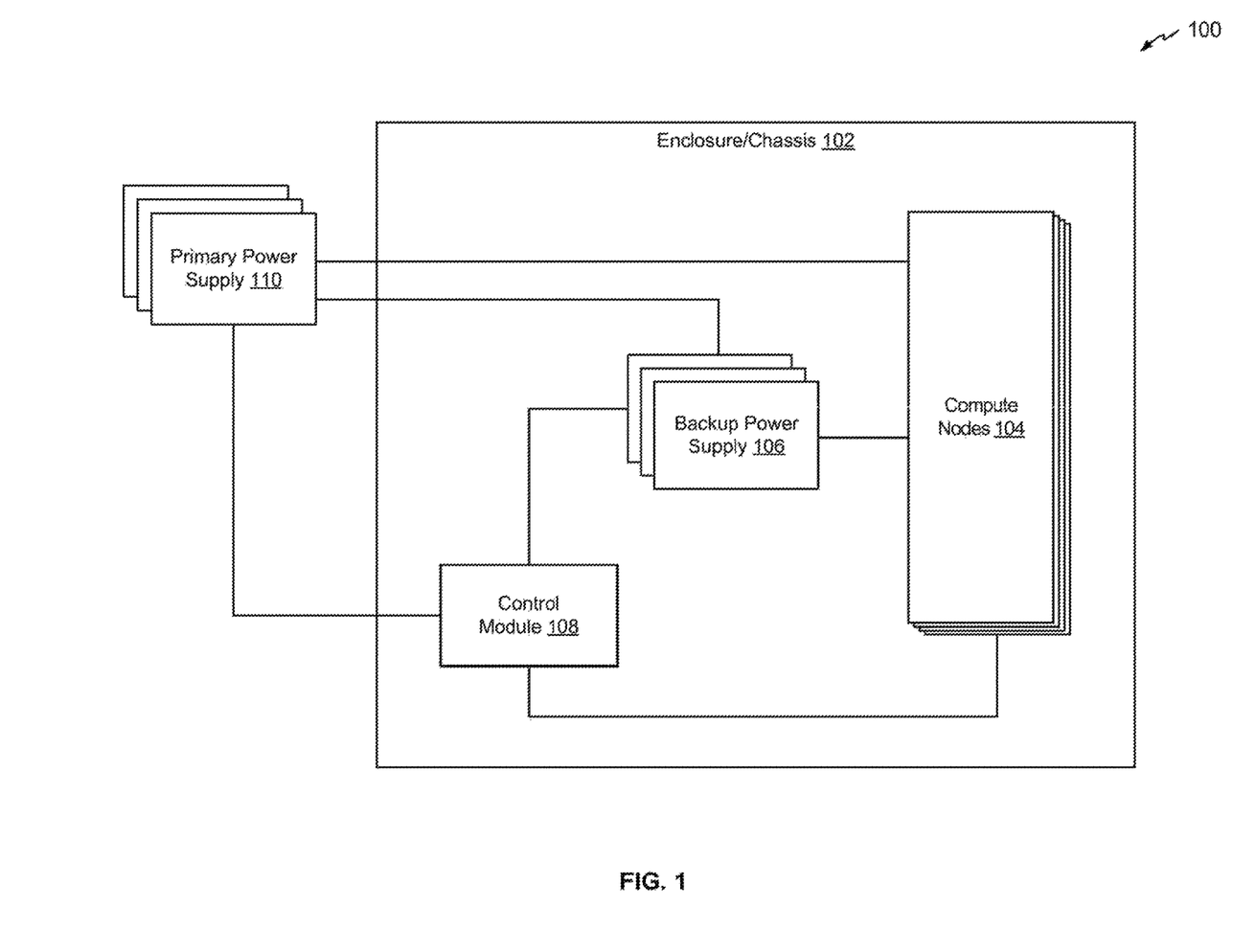
FIG. 1 is a block diagram of a system including a control module to selectively enable backup power to a plurality of nodes, according to an example.

Referring now to the figures, FIG. 1 is a block diagram of a system including a control module to selectively enable backup power to a plurality of nodes, according to an example. System 100 can include an enclosure/chassis 102 of the computing system 100. The enclosure/chassis 102 can include a plurality of compute nodes 104, at least one backup power supply 106, and a control module 108. Control module 108 can be operatively coupled to the compute nodes 104 and to the at least one backup power supply 106.

Nodes 104 can include a server such as a blade server, a rack server, or a tower server for example. Nodes 104 can each include a plurality of loads. For example, a load can be a cache memory, dual in-line memory module (DIMM), nonvolatile dual in-line memory module (NVDIMM), hard drives, network interface controller (NIC), video card, processing resource, and/or array control logic, among other storage controllers and/or devices.

Backup power supply 106 can be or include an energy component to convert stored energy to electrical energy to deliver power (i.e., backup power) to the nodes 104 (and corresponding loads) in the event of loss of power from the primary power supply 110. Examples of backup power supply 106 can include, but are not limited to, a rechargeable battery, a capacitor (e.g., supercapacitor, ultracapacitor, etc.), a flywheel, and the like. Primary power supply 110 can include an alternating current (AC) power supply such as voltage from a wall outlet (mains supply) that is lowered to a desired voltage (e.g., 12V). Primary power supply 110 can power the components and devices in the enclosure/chassis 102 including charging the backup power supply 106. As explained above, backup power supply 106 can be shared by the nodes 104 on a chassis/enclosure level, compared to, for example, a node-based level where the backup power supply 106 is provided to each node 104. In this manner, potential data loss and reliability issues presented by a node-based backup power supply failure may be avoided, by dynamically monitoring the status, capacity, and health of the backup power supply 106, determining the backup power demand of the nodes 104, and allocating backup power, using the control module 108.

Control module 108 may include, but is not limited to, a processor, circuit logic, a set of instructions executable by a processor, a microchip, a chipset, an electronic circuit, a microprocessor, a microcontroller, a central processing unit, or the like (i.e., hardware, firmware, logic and/or executable instructions). Control module 108 can be a management system, such as a rack manager. Control module 108 can be responsible for and manage a plurality of functionalities of the backup power supply 106 and the nodes 104. For example, control module 108 may control power charging and discharging of the backup power supply 106 or other operations of the backup power supply 106 such as communication with the nodes 104, provide protection to the backup power supply 106 such as short circuit protection, charge/discharge protection, current/voltage protection, temperature protection, communication accuracy/error robust protection etc.

In various examples, control module 108 can selectively enable output power from the backup power supply 106 to the nodes 104 based on a comparison of the power capacity of the backup power supply and a power demand of the nodes 104. The selective enablement of backup power can be in response to a loss of primary power from the primary power supply 110. Further, the selective enablement of power from the backup power supply 106 to the nodes can be based on a priority level of the nodes 104, a first-come-first-served basis, a round-robin schedule, or any other factor selected for allocating backup power to the nodes 104. Control module 108 can determine the backup power demand of the nodes 104 based on the quantity or amount of loads in each node 104. For example, the control module 108 can receive a quantity of loads from the nodes 104 and the control module 108 can determine the backup power demand by estimating the backup power demand based on the quantity of loads and an estimated power demand per load.

During operation, for example, control module 108 can dynamically monitor the power capacity of the backup power supply 106 and backup power demand of the nodes 104 (and their loads) and make power allocation decisions on an on-going basis (e.g., based on priority), even prior to the backup power supply 106 being fully charged (or while being charged). For example, if the power demand of the nodes 104 exceeds the power capacity of the backup power supply 106, the control module 108 can selectively allocate power or enable output of power from the backup power supply 106 to a subset of nodes 104 based on priority (or any other factor), and incrementally enable out of backup power to the remaining nodes as the power capacity of the backup power supply 106 increases. Similarly, if the power capacity of the backup power supply 106 is degraded, control module 108 can selectively disable backup power to certain nodes 104 (e.g., based on priority), and initiate a cache flush or other fail-safe operations of such nodes 104 to prevent data loss. As the backup power supply 106 continues to charge and the power capacity increases, backup power can be enabled to more nodes 104. Accordingly, nodes 104 with higher priority can have their cache enabled much faster on an incremental basis while the backup power supply 106 is still being charged.

In various examples, the control module 108 can monitor the health (e.g., temperature, etc.) and status (e.g., capacity, etc.) of each of the plurality of nodes 104. If a fault is detected at the backup power supply 106, the control module 108 can isolate the faulty backup power supply 106 by tuning off a power supply that charges the faulty backup power supply 106, for example. In other examples, if the temperature of a backup power supply 106 reaches a certain levels, the control module 108 can take appropriate actions such as notifying a baseboard management controller of the system 100 to take actions to cool it down. In yet other examples, if the temperature of a backup power supply 106 exceeds a certain threshold level, the control module 108 can disable backup power from the backup power supply to the nodes 104 and initiate a cache flush of the nodes 104. Once the temperature of the backup power supply 106 returns to normal, the control module can enable backup power from the backup power supply 106 to the nodes 104.

In some examples, the nodes 104 and the backup power supply 106 are modular such that they can be hot-plugged into the enclosure/chassis 102. As used herein, "hot-pluggable" or "hot-plug" means the component or device is replaceable (either by addition or removal) without having to shut down the system. Thus, the backup power supply 106 can be easily replaced at the enclosure/chassis level instead of replacing individual backup power supplies on the nodes 104. In an example where an additional backup power supply 106 is detected, control module 108 can reallocate power to the nodes based on the additional backup power supply 106 (e.g., due to an increase in power capacity).

In other examples, the control module 108 can detect the addition or removal of nodes 104 (i.e., hot-insertion/hot-removal) and reallocate power to the nodes accordingly. For example, if the power capacity of the backup power supply 106 is not enough to handle a newly-inserted node 104, the control module 108 may deny backup power to that node until the power capacity of the backup power supply increases and is enough to handle the newly-inserted node 104. As another example, when a hot-removal of a node 104 is detected (e.g., via request for hot-removal), the control module 108 can initiate a cache flush of the node 104 before the physical removal of the node 104 occurs. Once the cache is flushed and the node 104 is removed, the backup power previously allocated to that node 104 is reclaimed and added to the power capacity for supporting other nodes 104.

Figure 2:
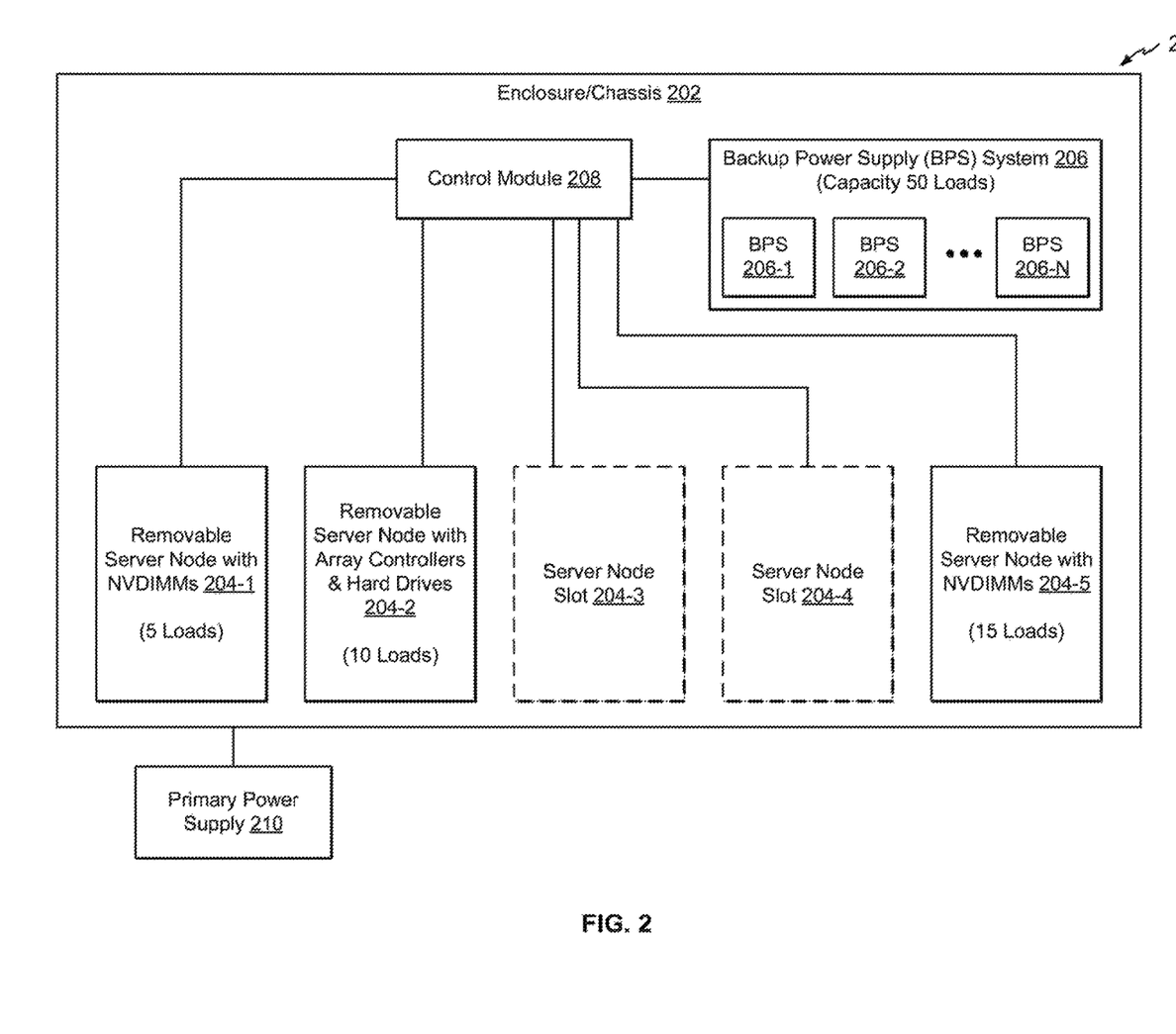
FIG. 2 is a block diagram of a system including a control module to selectively enable backup power to a plurality of nodes, according to an example.

FIG. 2 is a block diagram of a system including a control module to selectively enable backup power to a plurality of nodes, according to an example. System 200 includes an enclosure/chassis 202 having a plurality of components/devices. Enclosure/chassis 202 includes a control module 208 and a shared backup power supply (BPS) system including a plurality of BPS (e.g., BPS 206-1, 206-2 and 206-N, collectively referred to herein as BPS 206). Enclosure/chassis 202 also includes a plurality of nodes such as server nodes (e.g., server node 204-1, 204-2 and 204-5, collectively referred to herein as server node 204). The server nodes are hot-pluggable and can be inserted/removed in designated slots (e.g., server node slot 204-3 and 204-4 shown in dotted lines) in the enclosure/chassis 202. Enclosure/chassis 202 can be coupled to a primary power supply 210.

In the example of FIG. 2, BPS 206 has a power capacity that can support 50 loads. Thus, BPS 206 can provide backup power to 50 loads. Node 204-1 includes 5 loads, node 204-2 includes 10 loads, and node 204-5 includes 15 loads, as shown. During operation, when the BPS 206 reaches a charge level where the BPS 206 can serve 5 loads, the control module 208 enables output of backup power to node 204-1. Subsequently, when the BPS 206 charge reaches a level where the BPS 206 can serve 15 loads, the control module 208 enables backup power output to node 204-2. When the BPS 206 charge reaches a level where the BPS 206 can serve 30 loads, the control module 208 enables backup power output to node 204-5. If, for example, during runtime, node 204-5 is removed and replaced with a new node with 40 loads (i.e., bringing the total number of loads to 55), the control module 208 will not enable backup power output for the new node.

As another example, consider a scenario where the BPS capacity is 50 loads and node 204-1 has 12 loads with a $1^{st}$ priority level, node 204-2 has 15 loads with a $3^{rd}$ priority level, and node 204-5 has 15 loads with a $2^{nd}$ priority level. If, during operation, the BPS 206 becomes degraded (e.g., one or more of the BPS 206-1, 206-2 and 206-N degrades) and the BPS 206 capacity falls to 40 loads, since node 204-2 has the lowest priority, the control module 208 can instruct node 204-2 to flush its cache and disable write cache. Accordingly, node 204-2 does not receive backup power while node 204-1 and 204-5, with higher priorities, are enabled.

Figure 3:
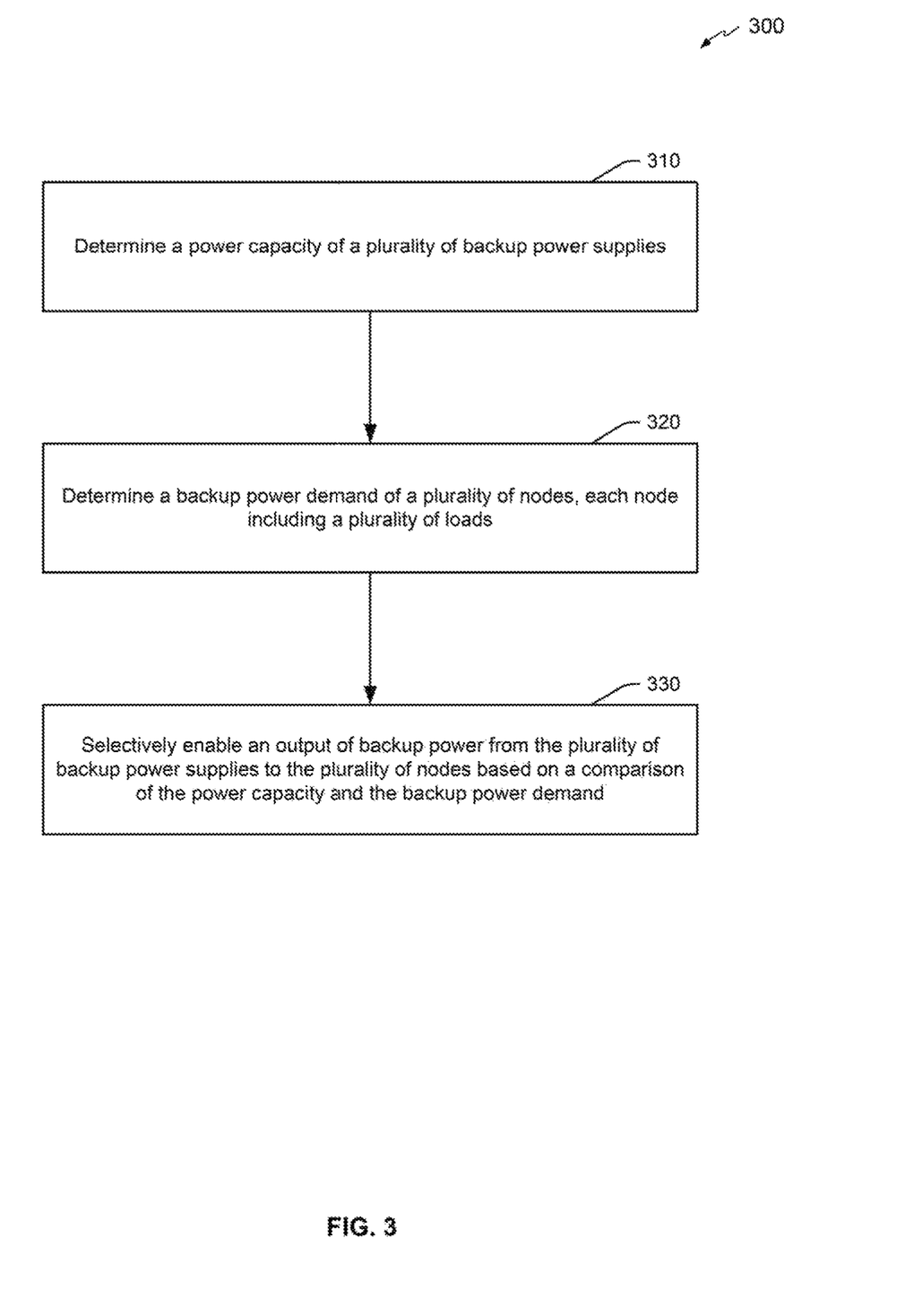
FIG. 3 is a flowchart illustrating a method for selecting enabling, by a control module, backup power to a plurality of nodes, according to an example.

FIG. 3 is a flowchart illustrating a method for selecting enabling, by a control module, backup power to a plurality of nodes, according to an example. Method 300 can be implemented, for example, in the form of executable instructions stored on a non-transitory machine-readable storage medium and/or in the form of electronic circuitry. The example method 300 will now be described with further reference to FIG. 1.

Method 300 includes determining a power capacity of a plurality of backup power supplies, at 310. For example, control module 108 can dynamically and continuously monitor the status and health of the plurality of backup power supplies 106 to determine the power capacity of the backup power supplies 106.

Method 300 includes determining a backup power demand of a plurality of nodes, each node including a plurality of loads, at 320. For example, control module 108 can determine the backup power demand of the nodes 104 based on a quantity or amount of loads in each node 104.

Method 300 also includes selectively enabling an output of backup power from the plurality of backup power supplies to the plurality of nodes based on a comparison of the power capacity and the backup power demand, at 330. For example, control module 108 can selectively enable the output of backup power from the backup power supplies 106 to the nodes 104 based on a comparison of the power capacity of the backup power supplies 106 and the power demands of the nodes 104. In various examples, the selective enabling is further based on a priority level of the nodes 104, on a first-come-first-served basis, or a round-robin basis. Further, the selective enabling can be performed incrementally and prior to the backup power supplies 106 being fully charged (e.g., while charging). In some examples, the method 300 of FIG. 3 includes additional steps in addition to and/or in lieu of those depicted in FIG. 3.

Figure 4:
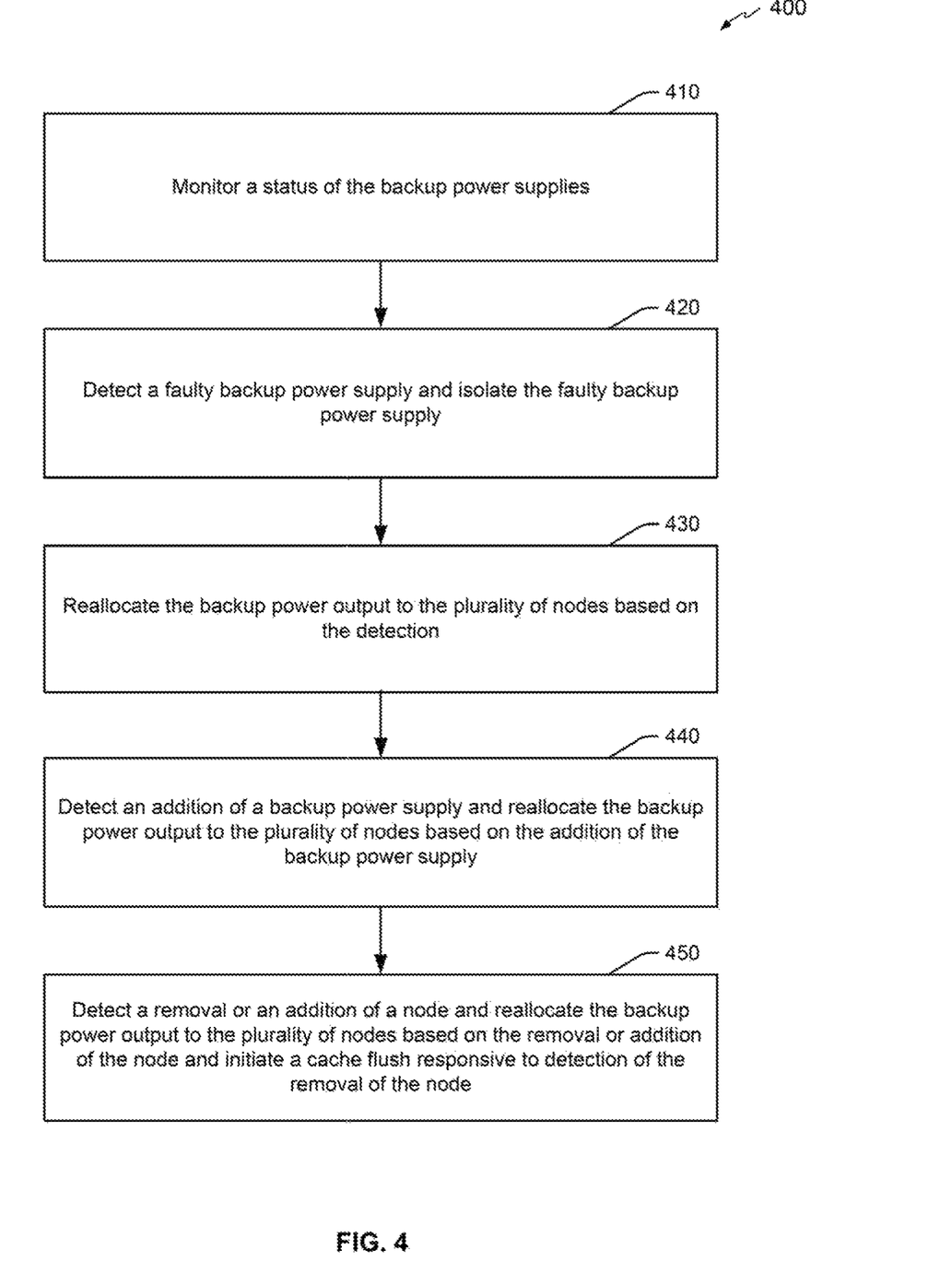
FIG. 4 is a flowchart illustrating a method for selectively enabling, by a control module, backup power to a plurality of loads, according to an example.

FIG. 4 is a flowchart illustrating a method for selectively enabling, by a control module, backup power to a plurality of loads, according to an example. Method 400 can be implemented, for example, in the form of executable instructions stored on a non-transitory machine-readable storage medium and/or in the form of electronic circuitry.

Method 400 includes monitoring a status of the backup power supplies, at 410. For example, control module 108 can monitor the health and status of the backup power supplies 106. Health and status information can include power capacity, charge level, temperature, fault, and other data associated with the backup power supplies 106.

Method 400 includes detecting a faulty backup power supply and isolating the faulty backup power supply, at 420. For example, control module 108 can detect a faulty backup power supply and isolate the faulty backup power supply 106 by disabling output of backup power from the faulty backup power supply 106 and/or turning off the power supply that charges the faulty backup power supply 106. In other examples, the control module 108 can take corrective actions such as initiating cooling down of backup power supply 106 whose temperature exceeds a certain threshold.

Method 400 includes reallocating the backup power output to the plurality of nodes based on the detection, at 430. For example, control module 108 can reallocate the backup power output from the remainder of the backup power supplies 106 (i.e., non-faulty backup power supplies 106) to the nodes 104 based on priority or other factors.

Method 400 includes detecting an addition of a backup power supply and reallocating the backup power output to the plurality of nodes based on the addition of the backup power supply, at 440. For example, if a backup power supply 108 is added which can lead to an increased capacity, the control module 108 can reallocate the backup power output to the nodes 104 based on the addition, thereby enabling more nodes 104.

Method 400 includes detecting a removal or an addition of a node and reallocating the backup power output to the plurality of nodes based on the removal or addition of the node and initiating a cache flush responsive to detection of the removal of the node, at 450. In various examples, the nodes 104 are modular such that they are hot-pluggable. In one example, in response to the removal or addition of a node, the control module 108 can reallocate the backup power output accordingly (i.e., enable more nodes or disable more nodes). Further, in response to a removal of the node 104, the control module 108 can initiate a cache flush of the node 104 to prevent data loss. In some examples, the method 400 of FIG. 4 includes additional steps in addition to and/or in lieu of those depicted in FIG. 4.

Figure 5:
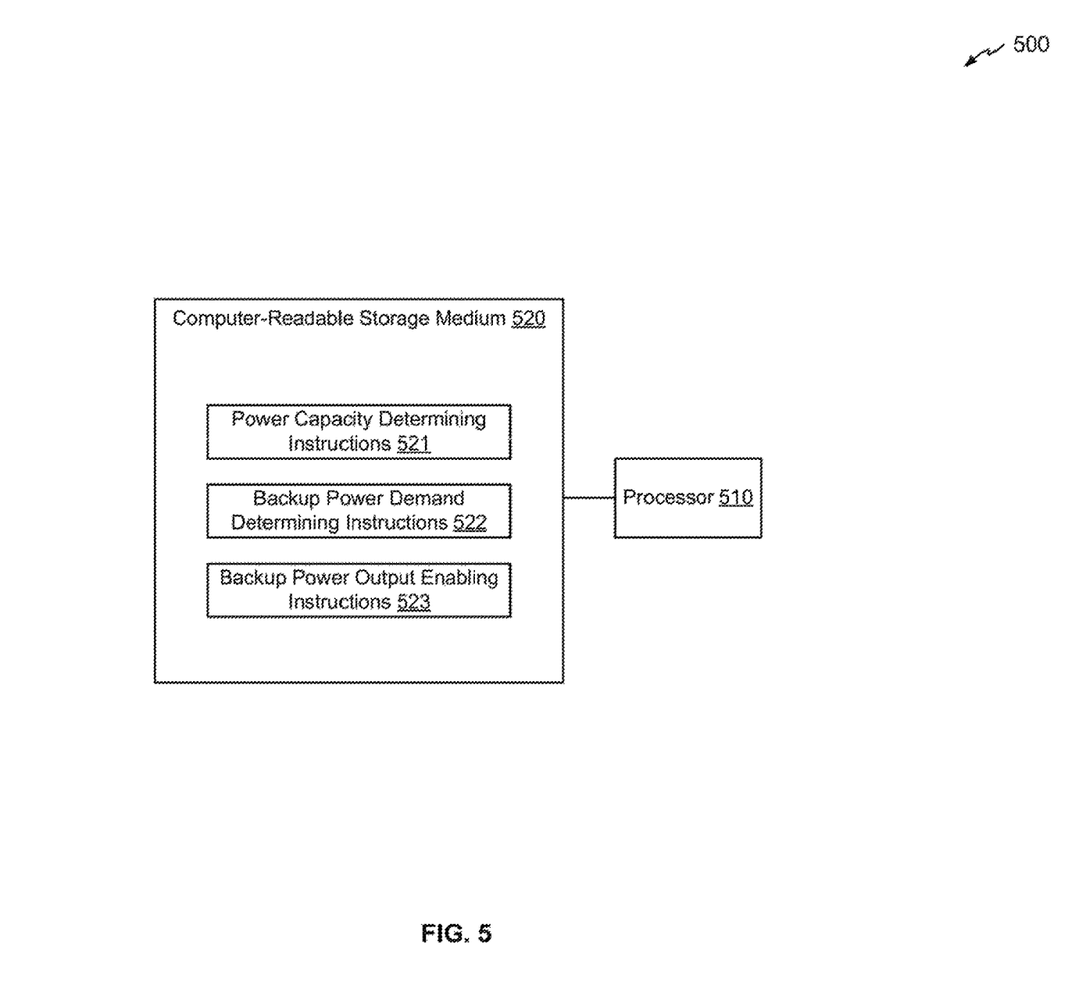
FIG. 5 is a block diagram of a computer-readable storage medium including instructions executable by a processor to selectively enable backup power to a plurality of nodes, according to an example.

FIG. 5 is a block diagram of a computer-readable storage medium including instructions executable by a processor to selectively enable backup power to a plurality of nodes, according to an example. Enclosure/chassis 500 includes computer-readable storage medium 520. Computer-readable storage medium 520 includes instructions 521, 522, and 523 executable by a processor 510 to perform the functionalities described therein.

Power capacity determining instructions 521 include instructions to determine a power capacity of a plurality of backup power supplies. For example, the instructions 521 can be executable to monitor a health and status, including power capacity, of a plurality of backup power supplies.

Backup power demand determining instructions 522 include instructions to determine a backup power demand of a plurality of nodes. For example, the instructions 522 can be executable to determine the backup power demand of nodes, where each node includes a plurality of loads. The demand can be based on a quantity or an amount of load in each node.

Backup power output enabling instructions 523 include instructions to selectively enable an output of backup power from the plurality of backup power supplies to the plurality of nodes based on the power capacity of the backup power supplies, the backup power demand of the nodes, and a priority level of the nodes, or a first-come-first-served basis, where the selective enablement is performed incrementally, prior to the backup power supplies being fully charged. Further, the instructions 523 can be executable to detect an addition of a backup power supply and reallocate backup power output to the nodes based on the addition, detect a removal or an addition of a node and reallocate backup power output to the nodes based on the addition or removal, and to initiate a cache flush in response to the removal of a node. In various examples, the backup power supplies and the nodes are modular and hot-pluggable.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A system, comprising:
    a plurality of compute nodes, wherein each node includes a plurality of loads;
    at least one backup power supply; and
    a control module coupled to the nodes and to the at least one backup power supply, the control module to:
        selectively enable an output of power from the at least one backup power supply to the nodes based on a comparison of a power capacity of the at least one backup power supply and a backup power demand of the nodes;
        monitor a health and a status of the at least one backup power supply; and
        isolate the at least one backup power supply in response to a fault being detected; and
        turn off a power supply that charges a faulty backup power supply.

2. The system of claim 1, wherein the control module is to selectively enable the output of power from the at least one backup power supply to the nodes based on a priority level of the nodes or a first-come-first-served basis.

3. The system of claim 1, wherein the control module is to selectively enable the output power from the at least one backup power supply to the nodes prior to the at least one backup power supply being fully charged.

4. The system of claim 1, wherein the control module is to incrementally enable the output of power from the at least one backup power supply to the nodes while the backup power supply is being charged.

5. The system of claim 1, wherein the control module is to determine the backup power demands of the nodes based on a quantity of loads in each node.

6. The system of claim 1, wherein the control module is to:
    detect an addition of a backup power supply and reallocate backup power to the nodes based on the addition;
    detect a removal or an addition of a node and reallocate backup power to the nodes based on the removal or addition; and
    initiate a cache flush prior to removal of the node,
    wherein the backup power supply and the plurality of nodes are hot-pluggable.

7. The system of claim 1, wherein if the power capacity of the at least one backup power supply is less than the backup power demand of the nodes, the control module is to determine a first subset of the nodes to receive backup power from the at least one backup power supply, and wherein the determination is based on a priority level assigned to the nodes or a first-come-first-served basis.

8. The system of claim 7, wherein the control module is to:
    determine a second subset of the nodes that do not receive backup power from the at least one backup power supply and initiate a cache flush of the second subset of nodes; and
    incrementally allocate backup power to the second subset of nodes as the power capacity of the at least one backup power supply increases.

9. The system of claim 1, wherein the control module is to reallocate the output of power to the nodes based on the isolation of the at least one backup power supply.

10. The system of claim 1, wherein the control module is to detect a hot-removal of a node and initiate a cache flush of the node.

11. A method, comprising:
    determining a power capacity of a plurality of backup power supplies;
    determining a backup power demand of a plurality of nodes, each node including a plurality of loads;
    selectively enabling an output of backup power from the plurality of backup power supplies to the plurality of nodes based on a comparison of the power capacity and the backup power demand;
    incrementally enabling the output of backup power to a selection of the plurality of nodes as the plurality of backup power supplies are being charged;
    monitoring a status of the backup power supplies;
    detecting a faulty backup power supply;
    isolating the faulty backup power supply;

turning off a power supply that charges the faulty backup power supply; and reallocating the backup power output to the plurality of nodes based on the detection.

12. The method of claim 11, comprising selectively enabling the output of backup power from the plurality of backup power supplies to the nodes based on a priority level of the nodes or a first-come-first-served basis, wherein the selective enabling is performed prior to the plurality of backup power supplies being fully charged.

13. The method of claim 11, comprising:

detecting an addition of a backup power supply and reallocating the backup power output to the plurality of nodes based on the addition of the backup power supply; and detecting a removal or an addition of a node and reallocating the backup power output to the plurality of nodes based on the removal or addition of the node and initiating a cache flush in response to detecting the removal of the node, wherein the plurality of backup power supplies and the plurality of nodes are modular such that they can be hot-plugged.

14. The method of claim 11, further comprising determining the backup power demands of the nodes based on a quantity of loads in each node.

15. A non-transitory computer-readable storage medium encoded with instructions executable by a processor of a computing system, the computer-readable storage medium comprising instructions to:

determine a power capacity of a plurality of backup power supplies;

determine a backup power demand of a plurality of nodes; and selectively enable an output of backup power from the plurality of backup power supplies to the plurality of nodes based on the power capacity of the backup power supplies, the backup power demand of the nodes, and a priority level of the nodes or a first-come-first-served basis, wherein the selective enablement is performed incrementally, prior to the backup power supplies being fully charged;

detect an addition of a backup power supply and reallocate backup power output to the nodes based on the addition of the backup power supply;

detect a removal or an addition of a node and reallocate backup power output to the nodes based on the removal or addition of the node;

initiate a cache flush in response to the removal of the node, wherein the plurality of backup power supplies and the plurality of nodes are hot-pluggable;

monitor a health and status of the at least one backup power supply; and turn off a power supply that charges a faulty backup power supply.

* * * * *